Patented Aug. 5, 1952

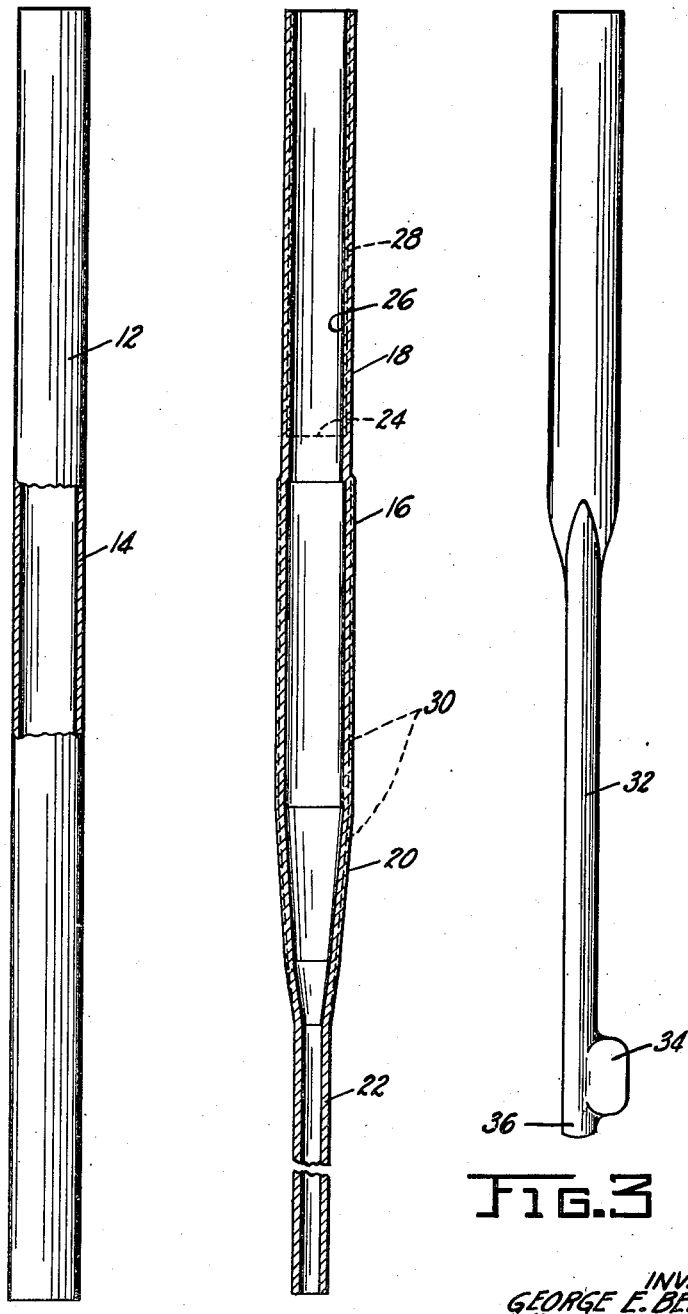

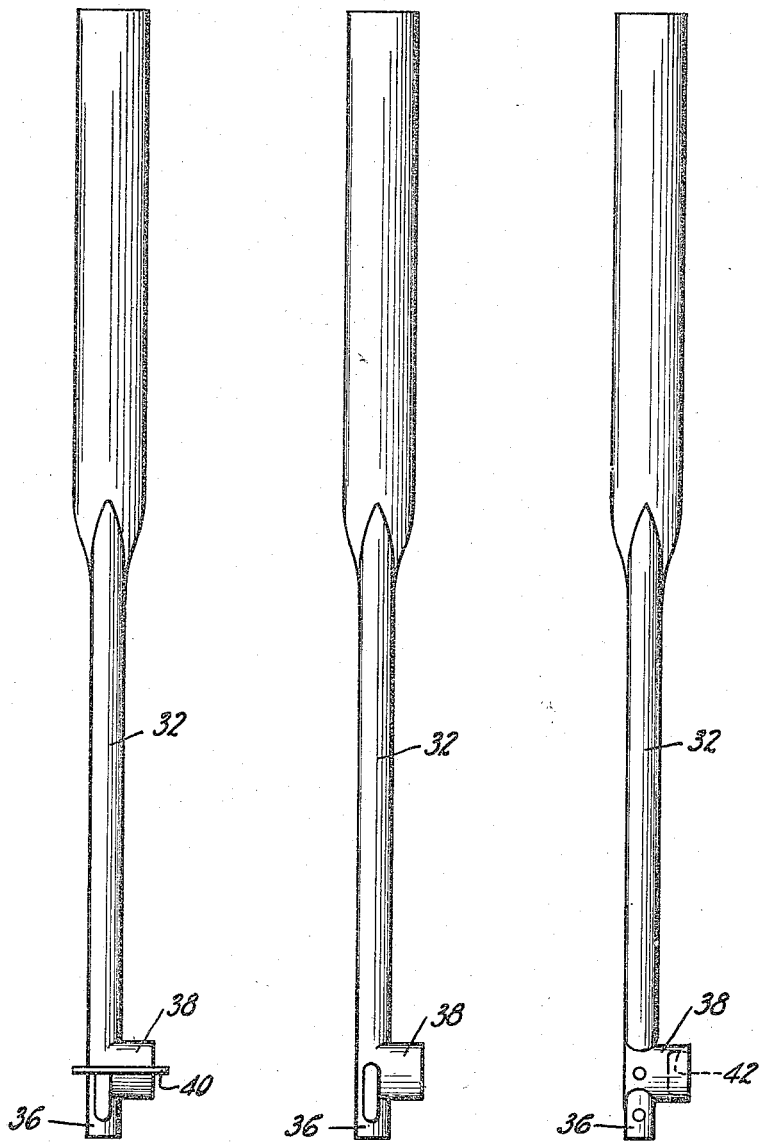

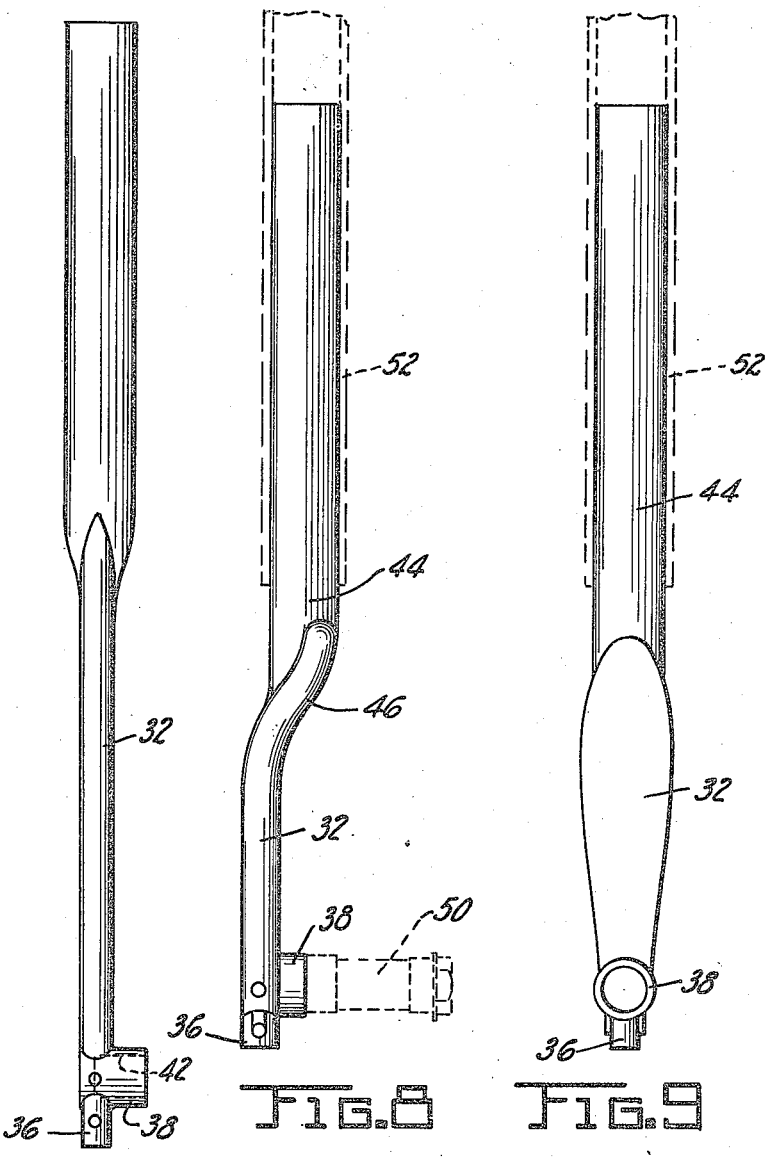

2,605,985

UNITED STATES PATENT OFFICE 2,605,985

LOWER MEMBER OF TELESCOPING SHOCK STRUT

George E. Beringer and Wilbur E. Sanders, South Bend, Ind., assignors to Bendix Aviation Corporation, South Bend, Ind., a corporation of Delaware Application December 18, 1946, Serial No. 717,026

5 Claims. (Cl. 244—100)

This invention relates to the structure which constitutes the lower member of a telescoping shock strut. The method of making such a member is the subject of application 282,669 filed April 16, 1952.

Shock struts which form part of the landing gear of aircraft conventionally comprise upper and lower telescoping cylinders or tubular members, the upper member being secured to the body of the aircraft, and the lower member being arranged to carry the axle and wheel. The lower member of the shock strut, in addition to the tubular member which forms a part of the telescoping mechanism, often has a bent fork or leg which extends downwardly from the tubular portion and which carries the axle at its lower end. The reason for bending the leg is to cause the lower extremity of the leg to be offset from the vertical axis of the tubular portion of the strut. This arrangement has a twofold purpose: (1) to bring the center of the wheel more nearly in line with the axis of the strut, thereby reducing the bending moment tending to cause binding in the strut bearings, and also permitting a reduction in wall thickness and weight; and (2) to hold to a minimum the overall width, or thickness, of the landing gear, thereby making it easier to provide a suitable space into which the gear can be retracted. In connection with the latter purpose, it should be understood that the upper portion of the landing gear, i. e., that portion which is secured to the aircraft, often is the widest portion because of the provision of means for fastening it to the body of the craft and for retracting it. By providing a bent leg, the excess space on one side of the strut is utilized at the bottom of the landing gear as well as at the top, thereby reducing the overall width dimension.

Heretofore, it has been the practice to manufacture the lower part of the shock strut either by using a single solid forging, or by welding or otherwise securing together two pre-formed members, one of which constitutes the lower telescoping tube of the strut, and the other of which constitutes the bent leg, or fork, which carries the axle and wheel. In the first method, the manufactured strut element is usually quite heavy because the metal is not fully homogeneous and cannot carry as much stress as if it were, and because there must be forging tolerances resulting in excess stock which cannot be removed. In the other method, the separate bent leg, or fork, is usually a heavy forging, requiring sufficient material to provide the necessary fitting for connecting the two members together.

The primary object of the present invention is to provide a single, or unitary, member which serves both as the lower tube of the strut and as the axle-carrying leg, or fork, and which is manufactured by performing a series of forming operations on a piece of tubular stock. Such a procedure results in a structure which has the following advantages: (a) it constitutes a stronger member because of its structural homogeneity; (b) it weighs less than conventional structures, because of the tubular structure, and because of the elimination of certain fittings; (c) it requires less space, and therefore reduces the width dimension of the landing gear; and (d) it is easier and less expensive to manufacture than conventional structures.

Other objects and advantages of the present invention will become apparent during the course of the following description, reference being had therein to the accompanying drawings, in which:

Figure 1 is a view showing partly in outline, and partly in section, a piece of tubular stock before undergoing the forming operations which transform it into the lower member of a shock strut;

Figure 2 is a sectional view showing the condition of the blank after the tube-reducing operation which provides the desired outside diameter and wall thickness;

Figure 3 shows the exterior of the structure after the first forging, or upsetting, operation;

Figures 4 to 7, inclusive, show the exterior of the structure after the second to fifth forging operations, respectively; and Figures 8 and 9 show front and side views, respectively, of the finished article.

As shown in Figure 1, the forming operations start with a piece 12 of tubular stock, having a wall 14 of suitable thickness. The tubular blank 12, which is seamless, is first formed to the shape shown in Figure 2 by the method described in Dewey Patent No. 2,265,723, issued December 9, 1941. By using the process of the Dewey patent it is possible to reduce a length of tubing of uniform diameter and circular cross-section, as shown in Figure 1, to the desired outer diameter, while at the same time controlling the thickness of the tube wall in accordance with the structural requirements of the member being formed. This feature is particularly important in the construction of airplane parts, because it permits the formation of hollow structural members having the least possible weight consistent with strength and rigidity requirements.

As illustrated in Figure 2, the short intermediate portion 16 of the tube is allowed to retain its original outer diameter, while the upper portion 18 is reduced slightly in diameter and thickened somewhat in wall section. Extending downwardly from the intermediate full diameter portion 16 is a tapering section 20 of the tube which merges at its lower end into the small-diameter, thickened portion 22 at the bottom of the tube.

The lower end of the tube is reduced in diameter and thickened preparatory to a forging, or upsetting, operation which will convert it into a substantially solid section axle-socket-providing element. The wall of the upper portion 18 is thickened in order to provide a shoulder 24, after the interior of the upper end of the tube has been machined to remove the metal shown between the original inner surface 26 and the final surface, as indicated by the dotted line 28.

The exterior of the intermediate portion 16 and the tapered portion 20 of the tube is machined to remove excess metal and reduce weight, leaving the outline shown by the dotted line 30.

The completion of the lower part of the shock strut is accomplished by a series of upsetting and piercing operations, the successive products of which are illustrated in Figures 3 to 9, inclusive.

In the first upsetting operation, the tube of Figure 2, after being machined as described above, is heated to a suitable forging temperature and placed in the first set of dies of a multiple operation forging machine. Only the thickened lower portion 22 and the tapered portion 20 of the tube need be heated because the subsequent forming operations affect only the lower part of the tube. In the first forging operation, the sides of the tapered portion of the tube are squeezed between the stationary and movable side-gripping dies to flatten the walls of this part of the tube, and the lower end of the tube is upset by the heading ram to provide a solid, or closed, end portion, and, at the same time, cause metal to flow into an enlarged laterally projecting axle-socket boss. The result of this first forging operation is the structure seen in Figure 3, wherein the lower part of the strut member is provided with a flattened portion 32 and a closed lower end having a laterally projecting boss 34 and a downwardly extending cylindrical nib 36. The flattened portion 32 of the strut member has a hollow substantially elliptical cross-section.

In the second forging operation, the strut member is moved to a new position in the forging machine and the lower end is again upset by a heading tool to convert the oblong boss 34 of Figure 3 into the cylindrical boss 38 of Figure 4, and lengthen the nib 36, as shown.

In the third operation in the forging machine, the flash, or fin, 40 left by the previous upsetting is removed, resulting in the structure shown in Figure 5.

Assuming that the multiple operation forging machines are each constructed to perform three forming steps, the remaining operations are accomplished by a second machine. Before the strut member is inserted in the second machine, the lower end of the member should be reheated to bring it to the initial working temperature.

In the fourth forging operation (the first in the second machine), the strut member is turned so that the cylindrical boss 38 faces the heading ram, and a piercing tool is driven into the boss to partially form the hole, or socket, 42 which is shown in dotted lines in Figure 6. At the same time, the metal which is caused to flow by the impact of the piercing tool reshapes somewhat both the boss 38 and the nib 36.

In the fifth forging operation a piercing tool is driven more deeply into the opening 42 to complete the axle-retaining socket (see Figure 7). This operation further clarifies the outline of the boss 38 and nib 36.

In the sixth, and final, forging operation, the sides of the flattened portion 32 of the strut member are acted on by forming dies which bend the structure adjacent the juncture of the tubular portion 44 and the flattened portion, thereby bringing the member to the shape shown in Figures 8 and 9.

In the substantially completed form shown in Figures 8 and 9, the strut member is constituted by a unitary, single-piece element having a tubular upper portion 44, a flattened leg 32 offset laterally from the axis of the tubular upper portion, an intermediate portion 46 bent along a reflex curve and arranged to join the tubular portion 44 with the leg 32, a hollow laterally-extending boss 38 located at the lower end of the leg 32, and a nib 36 which serves as a jack-point fitting in the completed landing gear, i. e. a point of engagement for the jack which is used to raise the plane to change a tire, or the like.

In Figure 8, dotted lines have been used to indicate the position of the axle 50 with respect to the lower member of the strut in the final landing gear assembly. As shown, the end of axle 50 extends into socket 42 in boss 38, and suitable means (not shown) are provided for securing the axle to the strut member.

Also, in both Figure 8 and Figure 9, dotted lines have been used to indicate the position, in the final landing gear assembly, of the upper telescoping member 52 of the shock strut with respect to the lower strut member, which has constituted the focus of the foregoing description. As shown, the upper end of the lower strut member may extend into the lower end of the upper strut member 52.

Of course, conventional landing gear require numerous other welded fittings, and the like, which have not been shown. However, such fittings do not form a part of the present invention, and their disclosure is not deemed necessary.

Although a particular embodiment of our invention has been described, it will be understood by those skilled in the art that the objects of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. For use as the lower member of a telescoping aircraft shock strut, a unitary single-piece element formed from a tube comprising: a tubular upper portion, a flattened leg parallel to but offset laterally from the axis of the tubular upper portion and integrally connected thereto, an intermediate portion bent along a reflex curve and merging at one end with the tubular upper portion and at the other end with the flattened leg to provide an integral connection therebetween, a hollow laterally-extending boss formed by upsetting the lower end of the flattened leg, said hollow boss providing a horizontal cylindrical axle socket, and a solid cylindrical jack-point fitting formed at the lower end of the flattened leg.

2. For use as the lower member of a telescoping aircraft shock strut, a unitary single-piece element formed from a tube comprising: a tubular upper portion, a flattened leg parallel to but offset laterally from the axis of the tubular upper portion and integrally connected thereto, an intermediate portion bent along a reflex curve and merging at one end with the tubular upper portion and at the other end with the flattened leg to provide an integral connection therebetween, the transverse dimension of said leg which is parallel with the plane of flattening tapering from the intermediate portion to the lower end of the leg, and a hollow laterally-extending boss on the lower end of the flattened leg, said hollow boss providing a horizontal cylindrical axle socket.

3. For use as the lower member of a telescoping aircraft shock strut, a unitary element formed from a tube comprising: a tubular upper portion, a flattened leg parallel to but offset laterally from the axis of the tubular upper portion and integrally connected thereto, an intermediate portion bent along a reflex curve and merging at one end with the tubular upper portion and at the other end with the flattened leg to provide an integral connection therebetween, the transverse dimension of said leg which is parallel with the plane of flattening tapering from the intermediate portion to the lower end of the leg, and a hollow laterally-extending boss on the lower end of the flattened leg, said hollow boss providing a horizontal cylindrical axle socket.

4. For use as the lower member of a telescoping shock strut, an element formed from a tube comprising: a tubular upper portion, a flattened leg parallel to but offset laterally from the axis of the tubular upper portion and integrally connected thereto, an intermediate bent portion merging at one end with the tubular upper portion and at the other end with the flattened leg to provide an integral connection therebetween, the transverse flattened dimension of said leg gradually diminishing from the intermediate portion to the lower end of the leg, and a hollow laterally-extending boss on the lower end of the flattened leg.

5. For use as the lower member of a telescoping shock strut, an element comprising: a tubular upper portion, a leg portion parallel to but offset laterally from the axis of the tubular upper portion and integrally connected thereto, said leg portion being relatively wide at the bent portion and tapering to its lower end, and a hollow laterally-extending boss formed by upsetting the lower end of the leg portion.

GEORGE E. BERINGER.
WILBUR E. SANDERS.

REFERENCES CITED

The following references are of record in the file of this patent:

UNITED STATES PATENTS

| Number | Name | Date |
| --- | --- | --- |
| 374,542 | Knous | Dec. 6, 1887 |
| 390,112 | Brown | Sept. 25, 1888 |
| 1,049,160 | Smith | Dec. 31, 1912 |
| 1,873,453 | Mogford | Aug. 23, 1932 |
| 1,989,032 | Westin | Jan. 22, 1935 |
| 2,005,306 | Wallis | June 18, 1935 |
| 2,136,007 | Gish | Nov. 8, 1938 |
| 2,376,951 | Wood | May 29, 1945 |
| 2,404,018 | Yaggy | July 16, 1946 |

FOREIGN PATENTS

| Number | Country | Date |
| --- | --- | --- |
| 353,531 | Italy | Oct. 20, 1937 |